(12) United States Patent
Kamiya et al.

(10) Patent No.: US 8,894,340 B2
(45) Date of Patent: Nov. 25, 2014

(54) CLIP

(71) Applicant: Daiwa Kasei Industry Co., Ltd., Aichi (JP)

(72) Inventors: Haruhisa Kamiya, Aichi (JP); Makoto Kato, Aichi (JP); Atsutoshi Kaji, Aichi (JP)

(73) Assignee: Daiwa Kasei Industry Co., ltd., Okazaki-Shi, Aichi (JP)

( * ) Notice: Subject to any disclaimer, the term of this patent is extended or adjusted under 35 U.S.C. 154(b) by 0 days.

(21) Appl. No.: 14/195,300

(22) Filed: Mar. 3, 2014

(65) Prior Publication Data
US 2014/0250643 A1 Sep. 11, 2014

(30) Foreign Application Priority Data
Mar. 7, 2013 (JP) .................................. 2013-045391

(51) Int. Cl.
*F16B 13/00* (2006.01)

(52) U.S. Cl.
CPC .................................... *F16B 13/001* (2013.01)
USPC ................................ 411/508; 24/292; 24/458

(58) Field of Classification Search
CPC ....................................................... F16B 13/001
USPC ................. 411/508–510, 913, 182, 433, 437; 24/292, 297, 458, 581.11; 296/1.08, 296/214, 146.7
See application file for complete search history.

(56) References Cited

U.S. PATENT DOCUMENTS

| | | | | |
|---|---|---|---|---|
| 4,765,036 A | * | 8/1988 | Iguchi et al. | 411/508 |
| 5,816,762 A | * | 10/1998 | Miura et al. | 411/433 |
| 6,042,296 A | * | 3/2000 | Wittig et al. | 411/509 |
| 6,095,734 A | * | 8/2000 | Postadan et al. | 411/182 |
| 6,135,425 A | * | 10/2000 | Platt | 411/508 |
| 6,203,240 B1 | * | 3/2001 | Hironaka et al. | 411/508 |
| 6,320,134 B1 | * | 11/2001 | Rehberg et al. | 174/135 |
| 6,824,203 B2 | * | 11/2004 | Kanie | 296/204 |
| 7,036,875 B2 | * | 5/2006 | Kanie | 296/204 |
| 7,496,993 B2 | * | 3/2009 | Kosidlo et al. | 24/295 |

(Continued)

FOREIGN PATENT DOCUMENTS

| | | |
|---|---|---|
| JP | 2007292146 | 11/2007 |
| JP | 2009287589 | 12/2009 |
| JP | 2010112420 | 5/2010 |
| JP | 2011089543 | 5/2011 |

OTHER PUBLICATIONS

English Translation of JP publication No. 2007-292146 published on Nov. 8, 2007.

(Continued)

*Primary Examiner* — Gay Ann Spahn
(74) *Attorney, Agent, or Firm* — Thomas | Horstemeyer, LLP

(57) ABSTRACT

Provided is a clip able to lock axial movement and circumferential movement thereof by employing a simple configuration. A hub of the clip can be inserted into an insertion hole formed in an undercover. In each elastic flap, a basal part is supported in a cantilever manner, and a free end part elastically deforms around the basal part which forms a fulcrum so as to approach or separate from an outer periphery. Each elastic flap spreads out from the basal part toward the free end part so as to increase in width in a circumferential direction. The clip is attached to the undercover such that axial movement and circumferential movement of the clip are locked.

3 Claims, 6 Drawing Sheets

(56) References Cited

U.S. PATENT DOCUMENTS

| | | | |
|---|---|---|---|
| 7,891,151 B2* | 2/2011 | Sano | 52/506.05 |
| 8,007,029 B2* | 8/2011 | Sano | 296/180.1 |
| 8,046,879 B2* | 11/2011 | Werner et al. | 411/508 |
| 8,282,047 B2* | 10/2012 | Franks | 411/508 |
| 8,322,110 B2* | 12/2012 | Chou et al. | 24/289 |
| 8,371,788 B2* | 2/2013 | Lange et al. | 411/433 |
| 8,516,770 B2* | 8/2013 | Bissinger et al. | 52/716.6 |
| 8,601,647 B2* | 12/2013 | Hasegawa et al. | 24/458 |
| 8,601,650 B2* | 12/2013 | Nakagawa | 24/458 |
| 8,757,951 B2* | 6/2014 | Rosemann et al. | 411/508 |
| 2002/0002762 A1* | 1/2002 | Sano | 24/609 |
| 2002/0056175 A1* | 5/2002 | Magarino | 24/289 |
| 2003/0071475 A1* | 4/2003 | Abejon et al. | 296/39.1 |
| 2003/0214153 A1* | 11/2003 | Kanie | 296/193.07 |
| 2005/0012010 A1* | 1/2005 | Kanie | 248/316.7 |
| 2005/0052056 A1* | 3/2005 | Kanie | 296/204 |
| 2007/0248436 A1* | 10/2007 | Sano | 411/175 |
| 2008/0044255 A1* | 2/2008 | Rosemann | 411/508 |
| 2008/0066266 A1* | 3/2008 | Scroggie et al. | 24/458 |
| 2008/0181748 A1* | 7/2008 | Rosemann et al. | 411/431 |
| 2008/0298925 A1* | 12/2008 | Shinozaki | 411/48 |
| 2009/0096249 A1* | 4/2009 | Sano | 296/180.1 |
| 2009/0133228 A1* | 5/2009 | Werner et al. | 24/297 |
| 2010/0024328 A1* | 2/2010 | Bissinger et al. | 52/208 |
| 2010/0111642 A1* | 5/2010 | Matsuno | 411/508 |
| 2010/0212252 A1* | 8/2010 | Chou et al. | 24/289 |
| 2011/0044782 A1* | 2/2011 | Lange et al. | 411/2 |
| 2012/0308333 A1* | 12/2012 | Hirakawa | 411/508 |
| 2013/0164099 A1* | 6/2013 | Rosemann et al. | 411/508 |

OTHER PUBLICATIONS

English Translation of JP publication No. 2009-287589 published on Dec. 10, 2009.

English Translation of JP publication No. 2010-112420 published on May 20, 2010.

English Translation of JP publication No. 2011-089543 published on May 6, 2011.

* cited by examiner

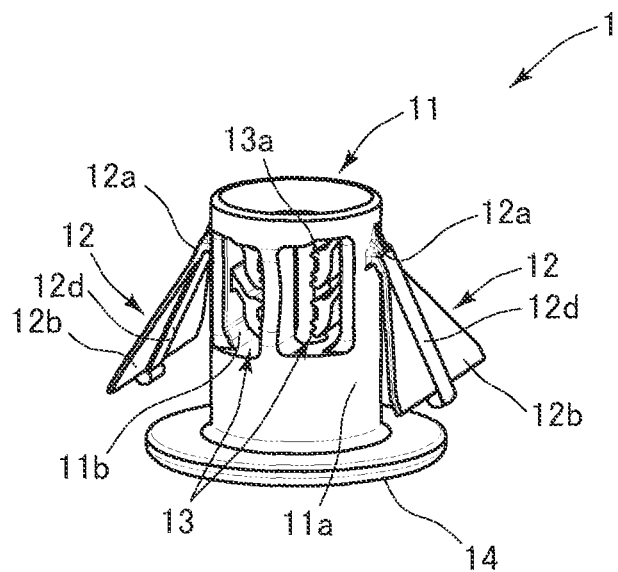
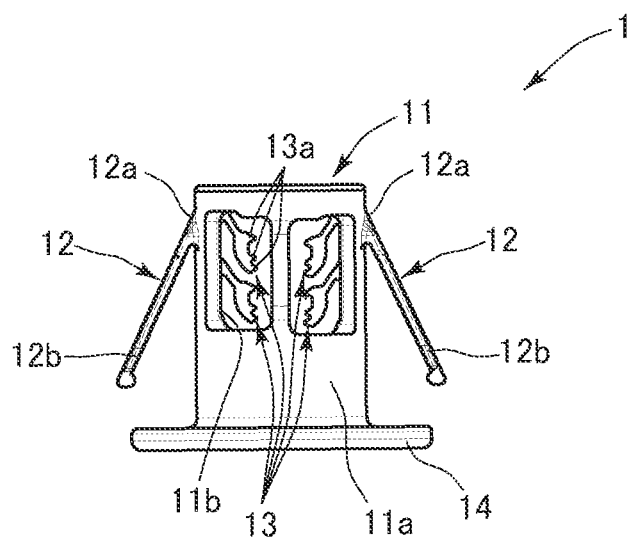

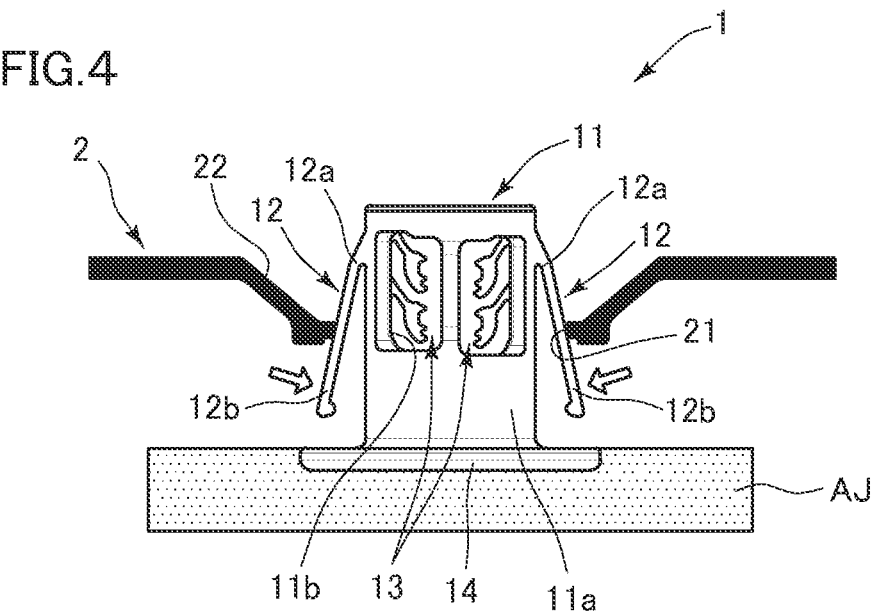
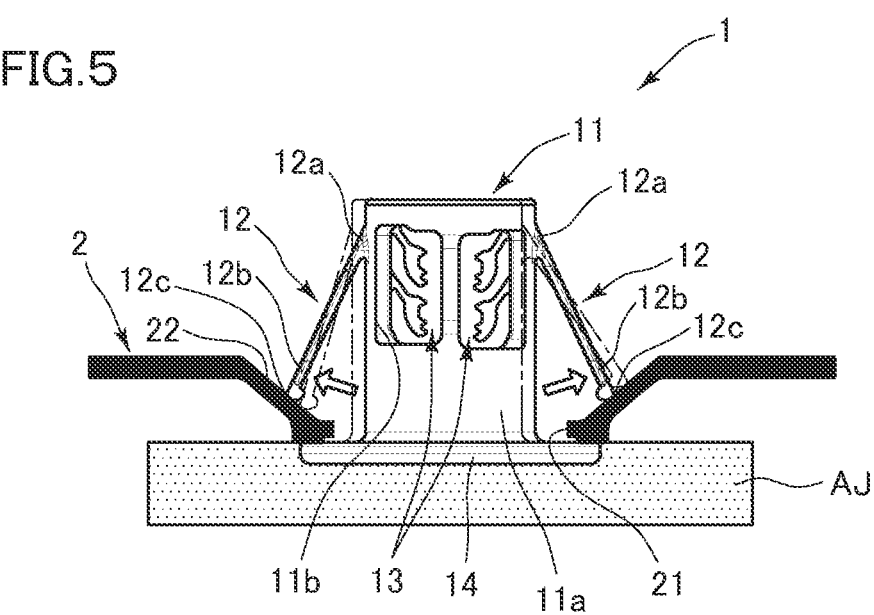

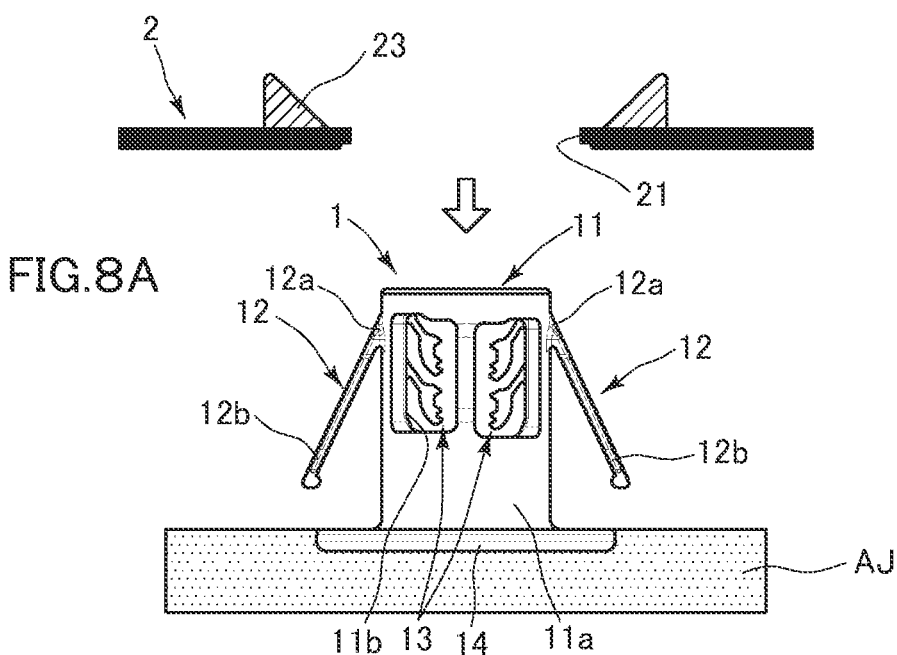
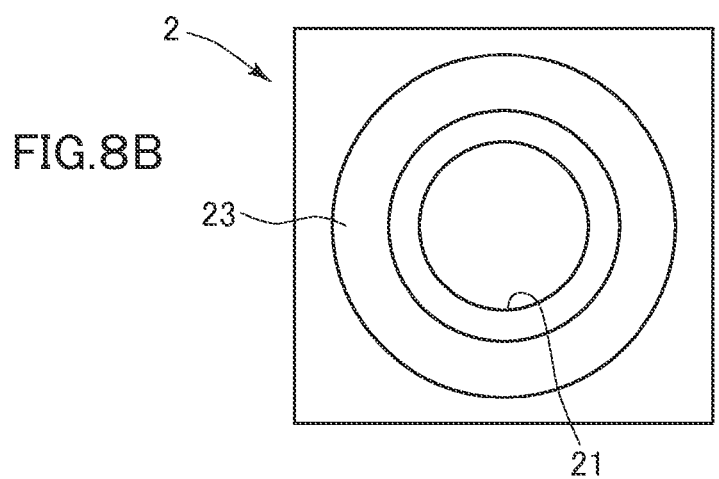
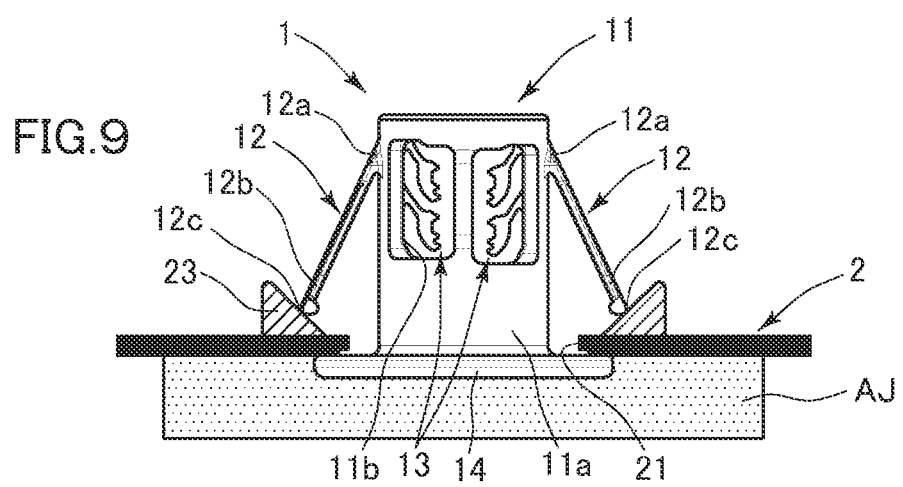

CLIP

RELATED APPLICATIONS

This application claims the priority of Japanese Patent Application No. 2013-045391 filed on Mar. 7, 2013. The disclosure of the prior application is hereby incorporated herein in the entirety by reference.

BACKGROUND OF THE INVENTION

1. Field of the Invention

The invention relates to a clip that is attached to a member to be mounted (especially, a cover such as an undercover for a vehicle).

2. Description of Related Art

For example, it has been found to improve an aerodynamic performance of a vehicle and hence a fuel cost thereof by mounting an undercover (a member to be mounted) on an underside of a vehicle body (a target member on which the undercover is mounted). Specifically, a cylindrical clip made of synthetic resin is attached to the undercover, and the undercover is mounted on the vehicle body via the clip. Therefore, such the clip is required to be free from backlash in an axial direction thereof when attached to the undercover, and to be held so as not to rotate in a circumferential direction thereof, that is, to be locked in its axial and circumferential movements.

In Patent Document 1, a clip is composed of an inner cylinder and an outer cylinder (two components). In each of Patent Documents 2 and 3, a clip is composed of a single cylindrical member (one component). Both the former and latter clips have a function of locking an axial movement and a circumferential movement of the clip being attached to an undercover. These clips require twisting (rotation) after insertion in an attaching hole (insertion hole) of the undercover, and they also have a complicated locking structure involving rotation. In contrast, in Patent Document 4, it suffices that a clip composed of a single cylindrical member (one component) be only inserted into an attaching hole of an undercover (i.e., it does not have to be twisted). However, this clip requires a more complicated structure in order to separately lock axial movement and circumferential movement thereof.

RELATED ART DOCUMENTS

Patent Document

[Patent Document 1]: JP2007-292146 A
[Patent Document 2]: JP2009-287589 A
[Patent Document 3]: JP2010-112420 A
[Patent Document 4]: JP2011-089543 A

SUMMARY OF THE INVENTION

An object of the invention is to provide a clip able to lock axial movement and cylindrical movement thereof by a simple configuration.

To solve the foregoing problem, this invention provides a clip attached to a member to be mounted such as an undercover for a vehicle. The clip includes a cylindrical or round-shaft-like hub able to be inserted into an insertion hole formed in the member to be mounted and a plurality of elastic flaps each of which includes a free end part that spreads out from a basal part, located on an outer periphery of the hub at one end of the hub in an axial direction and supported in a cantilever manner, separating from the outer periphery toward the other end in the axial direction, and being elastically deformable so as to approach or separate from the outer periphery.

The elastic flaps are arranged separately in a circumferential direction of the hub, wherein the free end part of each elastic flap entirely or partially comes into contact with an inclined or step part formed on the member to be mounted so as to continuously or discontinuously decrease diametrically from one end in the axial direction thereof toward the insertion hole, and is locked out of its axial movement and cylindrical movement, and thus can be attached to the member to be mounted.

The clip attached to the member to be mounted in such a manner is held by the inclined part or step part of the member to be mounted with the elastic forces of the plurality of elastic flaps provided on the outside of the hub. Accordingly, a function of simultaneously locking axial movement and circumferential movement can be imparted to the clip by employing a simple configuration. Moreover, an elastic flap is not provided all the way round the hub like a skirt, but a plurality of elastic flaps are provided separately in a circumferential direction. Therefore, the force (the elastic force of each elastic flap) with which the clip is held by the inclined or step part can be distributive applied to the inner periphery of the insertion hole and, therefore, the attached state of the clip stabilizes. It is desirable that the inclined or step part be in contact with the whole (entire surface) of the free end part of each elastic flap. However, even in the case where each free end part comes into contact with the inclined or step part partially, the force with which the clip is held by the inclined or step part can stabilize since the elastic flaps are separately arranged in a circumferential direction.

Additionally, since a member to be mounted such as an undercover is used for a part that is not flat but has the inclination or step. Accordingly, the degree of freedom in design, such as the shape of the member to be mounted, is improved. In terms of an inclined or step part provided for the member to be mounted, the member to be mounted itself may have the inclined or step part, or the inclined or step part may be separately provided around the entire circumference of the insertion hole or along part/parts of the circumference of the insertion hole, thus improving the degree of freedom in design.

When the hub is inserted into the insertion hole of the member to be mounted along the axial direction from the one end in the axial direction, each elastic flap comes into sliding contact with an inner peripheral edge of the insertion hole and elastically deforms such that the free end part approaches the outer periphery of the hub, and, after each elastic flap passes through the insertion hole, the elastic flap elastically returns to its original shape such that the free end part comes into point-, line-, or face-contact with the inclined or step part, thus the clip can be attached to the member to be mounted. Inserting the hub into the insertion hole of the member to be mounted along the axial direction from the one end in the axial direction, as described above, thereby using the elastic deformation (and elastic return) of each elastic flap, makes it possible to provide the clip that is excellent in assembly workability. Furthermore, since the elastic flaps are arranged separately in the circumferential direction, elastic forces can be distributive applied to the inner peripheral edge of the insertion hole, thus rendering the elastic deformation (and elastic return) smooth.

An insertion hole formed in the member to be mounted is a circular hole through which a cylindrical or round shaft-like hub can pass. However, the insertion hole may be in the shape of a key hole, as shown in Patent Document 2 (see FIGS. 7 and 8) and Patent Document 3 (see FIG. 4). In the shape of such a key hole, the hub (clip) does not have to be rotated. To integrally form a hub and elastic flaps for a clip from synthetic resin, polyacetal (POM), polypropylene (PP), polyamide (PA), or the like, for example, are used. Each elastic flap and hub may be formed from separate metal springs (e.g., plate springs).

Each of the elastic flaps is formed so as to increase in width in the circumferential direction toward the free end part from the basal part. Also, each elastic flap comes into contact with the inclined or step part in a plurality of places separate in the widthwise direction of at least the free end part. Since each elastic flap is formed in a simple, wing shape that spreads toward its rear end, the elastic flaps and hence the entire clip can be reduced in size and weight, thus rendering elastic deformation (and elastic return) smoother. Additionally, since the number of contact places (locking places) between the respective free end parts of the elastic flaps and the inclined or step part is increased, the axial movement and circumferential movement of the clip can be locked stably. The contact form (point-, line-, or face-contact) between each free end part and the inclined or step part may differ according to each contact place.

Additionally, the following clip can also be understood as an independent invention.

A clip is attached to a member to be mounted such as an undercover for a vehicle and used for attaching the member to be mounted to a target member, such as a vehicle body, on which the member to be mounted is mounted. The clip includes a cylindrical hub able to be inserted into an insertion hole formed in the member to be mounted and a plurality of elastic flaps each of which includes a free end part that spreads out from a basal part, located on an outer periphery of the hub at one end of the hub in an axial direction and supported in a cantilever manner, separating from the outer periphery toward the other end in the axial direction, and being elastically deformable so as to approach or separate from the outer periphery and a locking part provided on an inner periphery of the hub and lockable to an external thread part fixed to the target member.

The elastic flaps are arranged separately in a circumferential direction of the hub, wherein the free end part of each elastic flap entirely or partially comes into contact with an inclined or step part formed on the member to be mounted so as to continuously or discontinuously decrease diametrically from one end in the axial direction thereof toward the insertion hole, and is locked out of its axial movement and cylindrical movement, and thus can be attached to the member to be mounted.

And the external thread part is inserted into the hub from one end in the axial direction thereof, and the locking part is locked to the external thread part, and thus the member to be mounted can be mounted on the target member.

In this case, since the external thread part (e.g., stud bolt) fixed to the member on which the member to be mounted is mounted is inserted into the hub of the clip, the hub has a cylindrical shape.

Additionally, the following clip attaching structure can also be understood as an independent invention.

A clip-attaching structure is applied to a member to be mounted such as an undercover for a vehicle.

A clip used for the clip-attaching structure includes a cylindrical or round shaft-like hub able to be inserted into an insertion hole formed in the member to be mounted, and also includes a plurality of elastic flaps each of which includes a free end part that spreads out from a basal part, located on an outer periphery of the hub at one end of the hub in an axial direction and supported in a cantilever manner, separating from the outer periphery toward the other end in the axial direction, and being elastically deformable so as to approach or separate from the outer periphery.

The member to be mounted includes an insertion hole into which the hub can be inserted, and also includes an inclined or step part formed so as to continuously or discontinuously decrease diametrically toward the insertion hole.

The elastic flaps of the clip are arranged separately in a circumferential direction of the hub. So the free end part of each elastic flap entirely or partially comes into contact with an inclined or step part formed on the member to be mounted so as to continuously or discontinuously decrease diametrically from one end in the axial direction thereof toward the insertion hole, and is locked out of its axial movement and cylindrical movement, and thus is attached to the member to be mounted.

BRIEF DESCRIPTION OF THE DRAWINGS

FIG. 1 is a perspective view showing an embodiment of a clip according to the invention;

FIG. 2 is a front view of FIG. 1;

FIG. 4 is a view illustrating the course of attaching the clip to the undercover;

FIG. 5 is a view illustrating the completion of attaching the clip to the undercover;

FIG. 8A is a view illustrating a first modified example of FIG. 3A;

FIG. 8B is a plan view of the undercover shown in FIG. 8A;

FIG. 9 is a view illustrating a first modified example of FIG. 5;

DESCRIPTION OF THE EMBODIMENTS

Figure 3A:
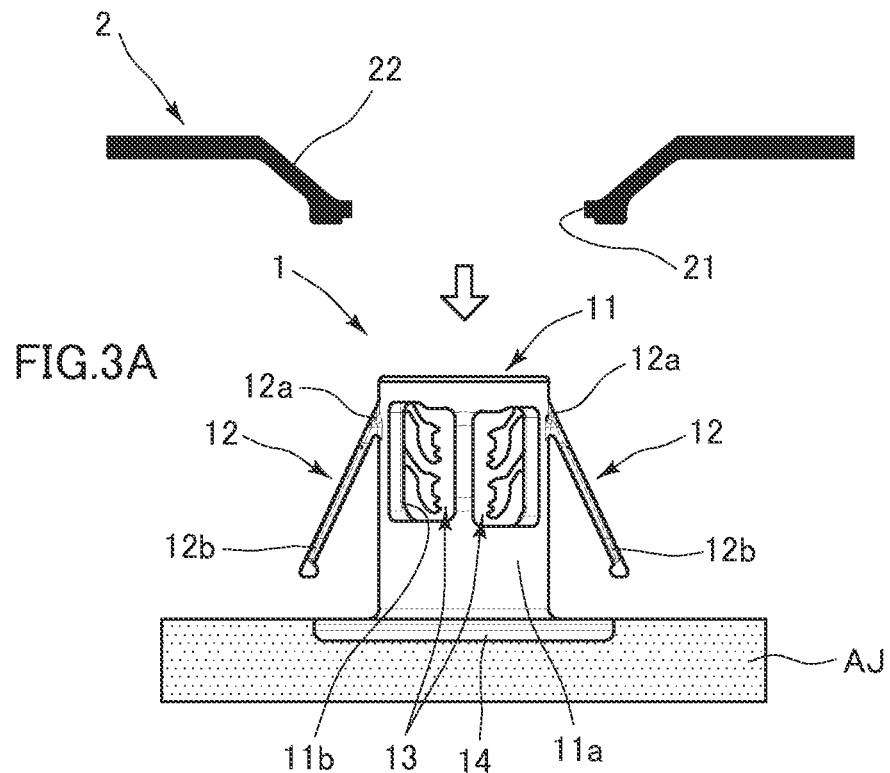
FIG. 3A is a view illustrating preparation for attaching a clip to an undercover.

Referring to the drawings, the embodiments of the invention will be described below. FIGS. 1 and 2 show an embodiment of a clip according to the invention. This clip is attached to an undercover 2 (a member to be mounted) for a vehicle (see FIGS. 5 and 6). The clip is used for mounting the undercover 2 on a vehicle body 3 (a target member on which the undercover 2 is mounted) (see FIG. 7). The clip 1 includes: a cylindrical hub 11 forming a body part; a plurality of elastic flaps 12 (in this embodiment, a pair of elastic flaps 12 symmetrical with respect to the axis of the hub 11); a plurality of locking parts 13 (in this embodiment, a total of four locking parts 13, i.e., two pairs of locking parts 13 symmetrical with respect to the axis of the hub 11); and a flange 14 connected to the lower end of the hub 11. The clip is integrally formed from synthetic resin (in this embodiment, polyacetal (POM)).

Figure 3B:
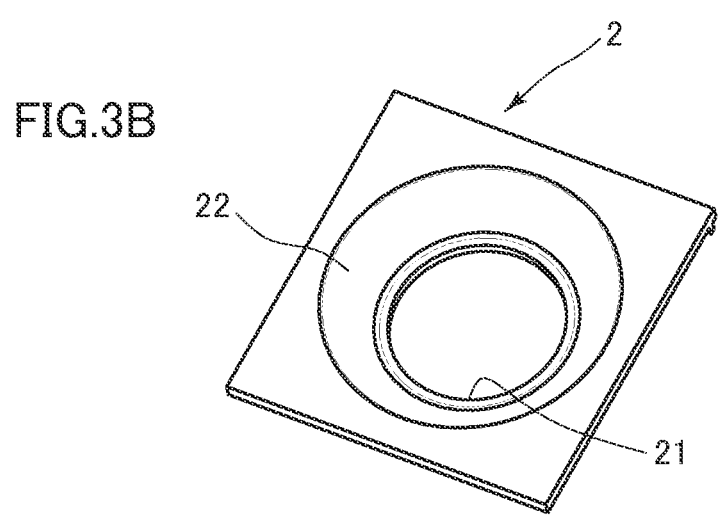
FIG. 3B is a perspective view of the undercover shown in FIG. 3A.
Figure 7:
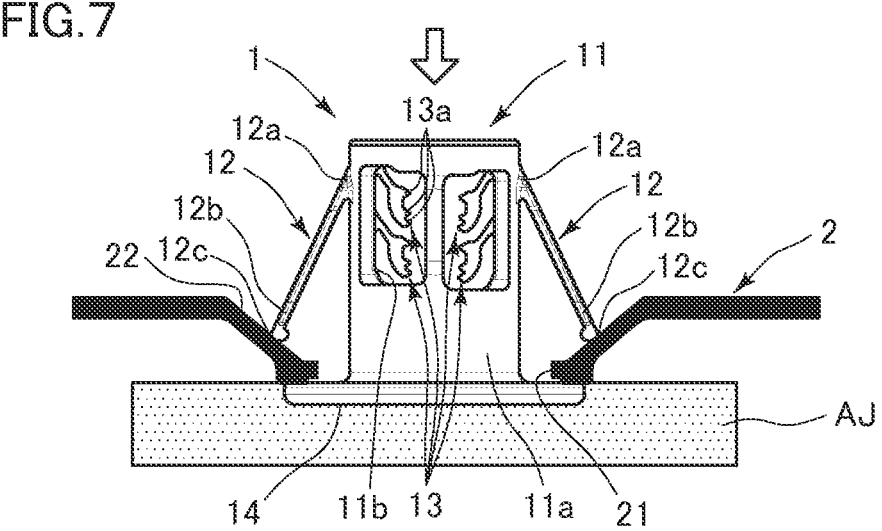
FIG. 7 is a view illustrating the attaching of the undercover to a vehicle body.

As shown in FIGS. 3A and 3B, the undercover 2 has a cylindrical insertion hole 21 in which the hub 11 can be inserted, and an inclined part 22 formed in a mortar-like shape so as to continuously decrease diametrically toward the insertion hole 21. As shown in FIG. 7, a stud bolt 31 (external thread part) is embedded in the vehicle body 3. The stud bolt 31 can be inserted into the hub 11.

Referring back to FIGS. 1 and 2, it is shown that the hub 11 of the clip 1 can be inserted in the insertion hole 21 (see FIG. 3B) formed in the undercover 2. In each elastic flap 12, a free end part 12b spreads out from a basal part 12a located on an outer periphery 11a of the hub 11 at one end (the upper side in FIGS. 1 and 2) of the hub 11 in the axial direction and supported in a cantilever manner, separating from the outer periphery toward the other end (the lower side in FIGS. 1 and 2) in the axial direction. Since the basal part 12a of each elastic flap 12 is supported in a cantilever manner, the free end part 12b elastically deforms around the basal part 12a which forms a fulcrum so as to approach or separate from the outer periphery 11a. Each elastic flap 12 is formed in a triangular wing shape, which spreads out from the basal part 12a toward the free end part 12b so as to increase in width in a circumferential direction. Each of these elastic flaps 12 comes into point-, line-, or face-contact with the inclined part 22 in a plurality of contact places 12c (three places, i.e., the middle and both ends of the free end part 12b, in the embodiment shown in FIG. 6), which are separate from one another in the widthwise direction of the free end part 12b. The clip 1 is attached to the undercover 2 such that its axial and circumferential movements are locked (See FIGS. 5 and 6).

Formed in the middle portion of each elastic flap 12 in its widthwise direction is a middle rib 12d extending from the basal part 12a to the free end part 12b. The thickness of the middle rib 12d is greater than that of the periphery thereof. The middle rib 12d is disposed as if it were the spine of the elastic flap 12. Additionally, with the clip attached to the undercover 2, the middle contact place 12c is defined (see FIG. 6) and, therefore, the middle rib 12d is able to restrict widthwise distortion when the elastic flap 12 elastically deforms.

Each locking part 13 projects inward integrally from an inner periphery 11b of the hub 11, and has a plurality of claw parts 13a (three, in this embodiment) able to lock the stud bolt 31 (see FIG. 7) embedded in the vehicle body 3. The flange 14 is set in an assembly jig AJ (see FIG. 3A) when the clip 1 is attached to the undercover 2.

Subsequently, an operating procedure will describe for attaching the clip 1 to the undercover 2 and mounting the undercover 2 on the vehicle body 3 via the clip 1 referring to FIG. 3A to 7.

<Preparation for Attachment> (FIG. 3A)

The flange 14 of the clip 1 is set in the assembly jig AJ, and the undercover 2 is lowered, with the inclined part 22 face-up (or raising the assembly jig AJ). Thus, the hub 11 is inserted into the insertion hole 21 along its axial direction from the one end of the hub 11 in its axial direction, that is, from the basal part 12a side of the elastic flap 12.

<In the Course of Attachment> (FIG. 4)

Each elastic flap 12 comes into sliding contact with the inner circumferential edge of the insertion hole 21 and elastically deforms such that its free end part 12b approaches the outer periphery 11a of the hub 11 around the basal part 12a which forms a fulcrum (specifically, each of the pair of elastic flaps 12 decreases diametrically.)

Figure 6:
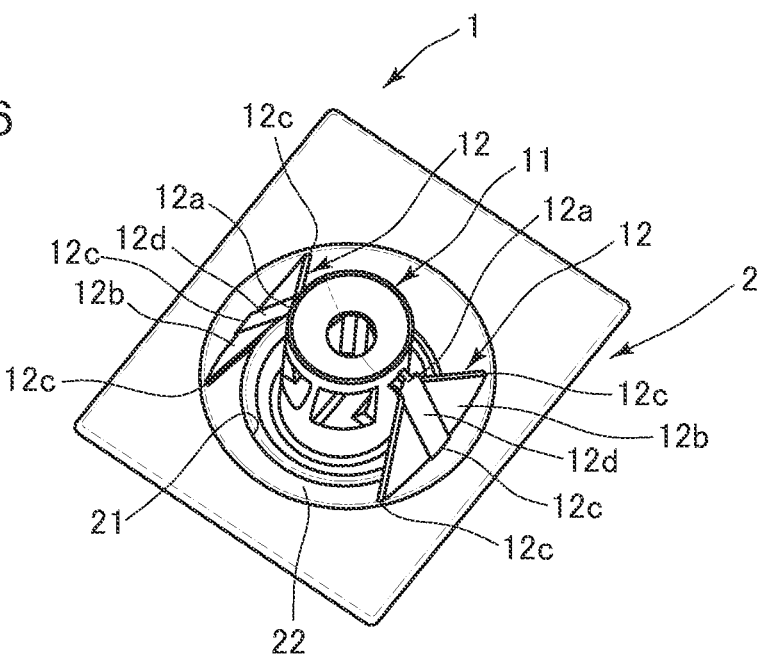
FIG. 6 is a perspective view of FIG. 5.

<Completion of Attachment> (FIGS. 5 and 6)

Each elastic flap 12 returns to its original shape (specifically, each of the pair of elastic flaps 12 increases diametrically) after passing through the insertion hole 21. Then, each elastic flap 12 comes into contact with the inclined part 22 in the three contact places 12c of the free end part 12b. Thus, the clip 1 is attached to the undercover 2 such that its axial movement and circumferential movement are locked.

<State of Undercover when Mounted on Vehicle Body> (FIG. 7)

With the stud bolt 31 projecting downward, the vehicle body 3 is lowered (or the assembly jig AJ is raised). Consequently, the stud bolt 31 is inserted into the hub 11 from its one end in the axial direction, that is, from the basal part 12a side of the elastic flap 12. The locking parts 13 (claw parts 13a) are locked by the thread of the stud bolt 31, and thus the undercover 2 is mounted on the vehicle body 3.

Simply by inserting the hub 11 into the insertion hole 21 of the undercover 2 from the basal parts 12a side of the elastic flaps 12 along the axial direction in such a manner, attachment of the clip 1 to the undercover 2 is completed such that the axial movement and circumferential movement of the clip 1 are locked. Assembly workability is thus excellent. Since the pair of elastic flaps 12 is arranged on the hub 11 so as to be symmetrical with respect to the axis, and the elastic force of each elastic flap 12 is distributively applied to the inner peripheral edge of the insertion hole 21, each elastic flap 12 smoothly and elastically deforms and returns to its original shape.

Additionally, since each elastic flap 12 inserted in the insertion hole 21 comes into contact with the inclined part 22 in three contact places 12c separate from one another in the widthwise direction of the free end part 12b, the clip 1 is held by the inclined part 22 of the undercover 2 while the axial movement and circumferential movement are locked almost simultaneously. Since the pair of elastic flaps 12 is arranged symmetrically with respect to the axis and the holding force (elastic force) of each elastic flap 12 is distributive applied to the inclined part 22, the attached state of the clip 1 is stabilized.

The number of contact places 12c defined on the free end part 12b of each elastic flap 12 is not limited to the three shown in FIG. 6, but may be two or four or more at both ends. Additionally, the length of each elastic flap 12, the angle formed between each elastic flap 12 and the outer periphery 11a of the hub 11 (hereinafter referred to as the angle of tilt of the elastic flap 12), and so on can be determined as required in accordance with the inclination angle or the depth of the inclined part 22 of the undercover 2, and so on.

FIGS. 3A to 7 show examples where the undercover 2 is mounted on the vehicle body 3 using one clip 1. However, in reality, a plurality of clips 1 are generally used. In particular, in a case where a plurality of clips are used, there may be displacement among the axis (axial line) of the hub 11 of each clip 1, the axis (axial line) of the corresponding insertion hole 21 of the undercover 2, and the axis (axial line) of the corresponding stud bolt 31 in the vehicle body 3 due to manufacturing error or the like. However, separation of clip 1 can be prevented by its elastic flaps 12, each of which has the form of a triangular wing shape that spreads out toward its rear end. For example, if displacement occurs between the axis of the hub 11 and that of the insertion hole 21, as indicated by dashed-dotted lines in FIG. 5, each elastic flap 12 changes in the amount by which it tilts (the angle of tilt) or in the contact places 12c of the free end part 12b, thereby bringing the free end part 12b of each elastic flap 12 into contact with the inclined part 22, thus preventing separation of the clip 1.

Modified Example 1

As shown in FIGS. 8A, 8B, and 9 instead of FIGS. 3A, 3B, and 5, an inclined part for an undercover 2 may be provided separately around an insertion hole 21. In the modified example 1, an inclined part 23 of a triangular cross-section is provided all the way round the insertion hole 21. In this case also, when a clip 1 is attached, a free end part 12b of each of its elastic flaps 12 comes into contact with the inclined part 23 and consequently the clip 1 is attached to the undercover 2 such that an axial movement and a circumferential movement of the clip 1 are locked almost simultaneously. A plurality of inclined parts may be provided in some areas around the insertion hole 21 (e.g., in two places symmetrical with respect to the axis so as to correspond to the elastic flaps 12).

Modified Example 2

Figure 10A:
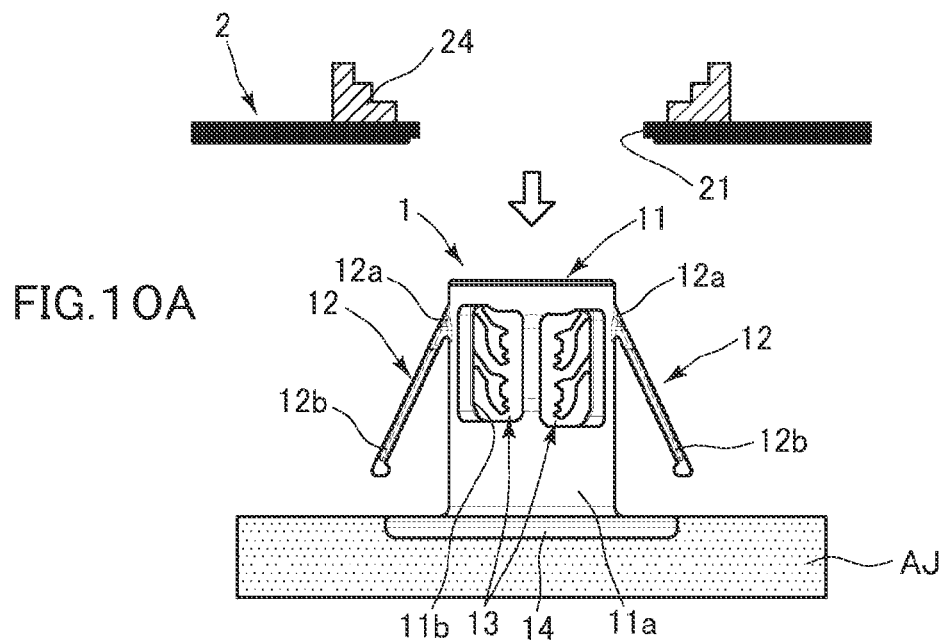
FIG. 10A is a view illustrating a second modified example of FIG. 3A.
Figure 10B:
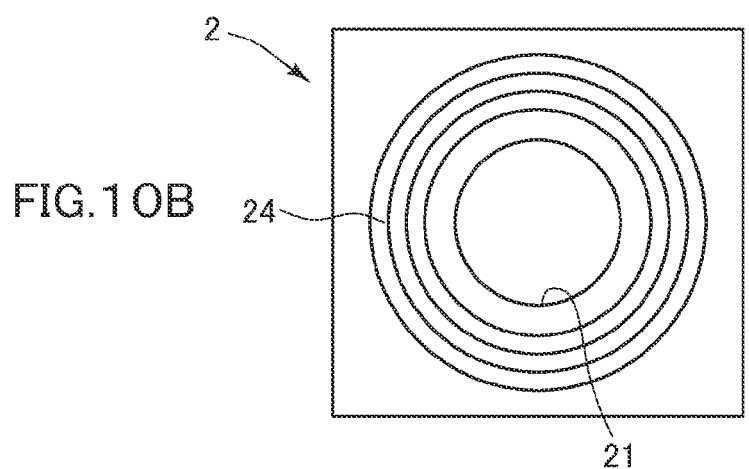
FIG. 10B is a plan view of the undercover shown in FIG. 10A.
Figure 11:
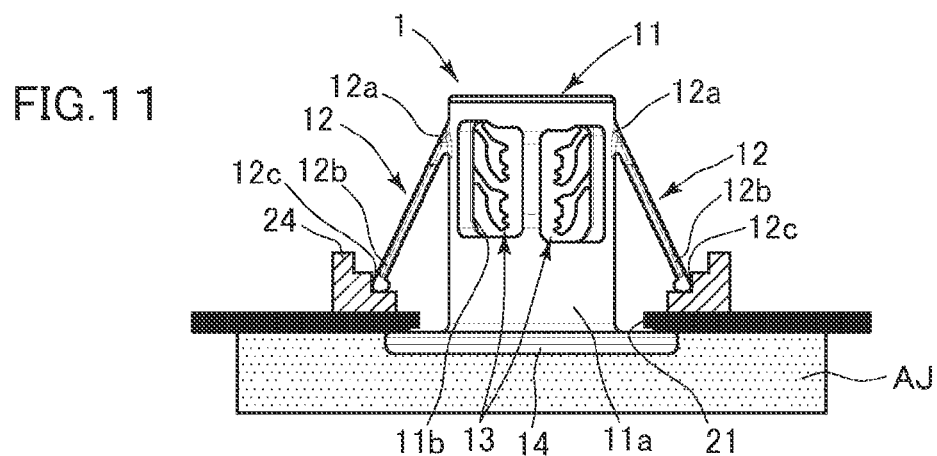
FIG. 11 is a view illustrating a second modified example of FIG. 5.

As shown in FIG. 11 instead of FIG. 5, a step part 24, which continuously decreases diametrically toward the insertion hole 21 of an undercover 2 from one end of a clip 1 in its axial direction, may be separately provided around the insertion hole 21 of the undercover 2. In the modified example 2 shown in FIGS. 10A, 10B, and 11, the step part 24 of a step-shaped cross-section is provided all the way round the insertion hole 21. In this case also, when the clip 1 is attached, the free end part 12b of each of its elastic flaps 12 comes into contact with the step part 24. Consequently the clip 1 is attached to the undercover 2 such that its axial movement and circumferential movement are locked almost simultaneously. A plurality of step parts 24 may be provided in some areas around the insertion hole 21 (e.g., in two places symmetrical with respect to the axis so as to correspond to the elastic flaps 12).

The foregoing description was given of the case where two elastic flaps 12, two inclined parts 23 and two step parts 24 are provided (one in each position). However, the numbers of these are not limited to two. In the modified examples shown in FIGS. 8A, 9, 10A, and 11, parts that have functions identical to those in FIGS. 3A and 5 are labelled with the same symbols, and explanations thereof are omitted. The embodiment and modified examples described above can be implemented in combinations as necessary within the scope in which technical discrepancy does not occur.

The descriptions were given above using an example where the undercover 2 for a vehicle serves a member to be mounted and the vehicle body 3, as a target member on which the undercover 2 is mounted. However, the clip 1 according to the invention may be used in other applications, some of which may not require the locking parts 13 of a clip 1 and a stud bolt 31 in a member 3 on which an undercover 2 is mounted.

What is claimed is:

1. A clip attached to a member to be mounted such as an undercover for a vehicle, the clip comprising:
    a cylindrical or round-shaft-like hub able to be inserted into an insertion hole formed in the member to be mounted; and
    a plurality of elastic flaps each of which includes a free end part that spreads out from a basal part, located on an outer periphery of the hub at one end of the hub in an axial direction and supported in a cantilever manner, separating from the outer periphery toward the other end in the axial direction, and being elastically deformable so as to approach or separate from the outer periphery;
    wherein the elastic flaps are arranged separately in a circumferential direction of the hub, wherein the free end part of each elastic flap entirely or partially comes into contact with an inclined or step part formed on the member to be mounted so as to continuously or discontinuously decrease diametrically from one end in the axial direction thereof toward the insertion hole, and is locked out of its axial movement and cylindrical movement, and thus can be attached to the member to be mounted.

2. The clip according to claim 1, wherein when the hub is inserted into the insertion hole of the member to be mounted along the axial direction from the one end in the axial direction, each elastic flap comes into sliding contact with an inner peripheral edge of the insertion hole and elastically deforms such that the free end part approaches the outer periphery of the hub, and wherein after each elastic flap passes through the insertion hole, the elastic flap elastically returns to its original shape such that the free end part comes into point-, line-, or face-contact with the inclined part or step part in places, and thus the clip can be attached to the member to be mounted.

3. The clip according to claim 1, wherein each of the elastic flaps is formed so as to increase in width in a circumferential direction toward the free end part from the basal part, and wherein each elastic flap comes into contact with the inclined or step part in a plurality of places separate in the widthwise direction of at least the free end part.

* * * * *